United States Patent
Bulin et al.

(10) Patent No.: US 9,643,714 B2
(45) Date of Patent: May 9, 2017

(54) AIRCRAFT PROPULSION UNIT COMPRISING A NACELLE PROVIDED WITH A FAN COWL LOCKING AND CLOSING MECHANISM

(71) Applicant: Airbus Operations (SAS), Toulouse (FR)

(72) Inventors: Guillaume Bulin, Le Croisic (FR); Patrick Oberle, Verdun sur Garonne (FR); Nicolas Devienne, Plaisance du Touch (FR); Matthieu Ritter, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 344 days.

(21) Appl. No.: 14/514,639

(22) Filed: Oct. 15, 2014

(65) Prior Publication Data

US 2015/0110619 A1 Apr. 23, 2015

(30) Foreign Application Priority Data

Oct. 18, 2013 (FR) ...................................... 13 60199

(51) Int. Cl.
*B64C 7/02* (2006.01)
*B64D 29/06* (2006.01)

(52) U.S. Cl.
CPC ............... *B64C 7/02* (2013.01); *B64D 29/06* (2013.01)

(58) Field of Classification Search
CPC ............................... B64D 29/06; B64D 29/08
See application file for complete search history.

(56) References Cited

U.S. PATENT DOCUMENTS

| 5,603,471 | A | 2/1997 | Armstrong | |
|---|---|---|---|---|
| 5,620,212 | A * | 4/1997 | Bourne | B64D 29/06 292/113 |
| 5,915,765 | A | 6/1999 | Sternberger | |
| 6,334,588 | B1 | 1/2002 | Porte | |
| 6,334,730 | B1 * | 1/2002 | Porte | B64D 29/08 244/129.5 |

(Continued)

FOREIGN PATENT DOCUMENTS

| FR | 2772342 | 6/1999 |
|---|---|---|
| FR | 2907759 | 5/2008 |
| GB | 225954 | 3/1993 |

OTHER PUBLICATIONS

French Search Report, Jul. 18, 2014.

*Primary Examiner* — Igor Kershteyn
*Assistant Examiner* — Justin Seabe
(74) *Attorney, Agent, or Firm* — Greer, Burns & Crain, Ltd.

(57) ABSTRACT

An aircraft propulsion unit comprising a nacelle with a fan cowl locking and closing mechanism. The fan cowls of the nacelle can be closed by a single operator in accordance with the ergonomic standards defined for a single individual. A nacelle is provided with a lateral locking mechanism configured to keep one of the two fan cowls in the closed position, so as to reduce the spacing between the two lower sides of the fan cowls, whereas the presence of a stop between a first elastic member provided on one fan cowl and a second elastic member provided on the other fan cowl allows the operator to provide only that effort required to overcome the force exerted by a single spring at a time.

5 Claims, 5 Drawing Sheets (56) References Cited

U.S. PATENT DOCUMENTS

| | | | |
|---|---|---|---|
| 9,188,025 B2* | 11/2015 | Calder | B64D 29/06 |
| 2010/0284806 A1* | 11/2010 | Vauchel | B64D 29/08 415/214.1 |
| 2011/0133489 A1 | 6/2011 | Hemeury et al. | |

* cited by examiner

AIRCRAFT PROPULSION UNIT COMPRISING A NACELLE PROVIDED WITH A FAN COWL LOCKING AND CLOSING MECHANISM

CROSS-REFERENCES TO RELATED APPLICATIONS

This application claims the benefit of the French patent application No. 1360199 filed on Oct. 18, 2013, the entire disclosures of which are incorporated herein by way of reference.

BACKGROUND OF THE INVENTION

The present invention relates to an aircraft propulsion unit, such as a jet engine, comprising a nacelle exhibiting fan cowls that can be closed and locked by a single operator.

An aircraft propulsion system comprises a nacelle surrounding a turbojet engine. For the purposes of maintaining the turbojet engine, the nacelle generally comprises two fan cowls articulated about pivoting axes which are substantially parallel to the longitudinal axis of the nacelle and disposed symmetrically on both sides of the support column by which the nacelle is suspended from the aircraft wing. Each fan cowl is movable between a closed position in which the fan cowl is disposed in the extension of the outer surface of the nacelle in such a manner as to cover the housing of the fan and an open position in which an operator can access the housing. The lower sides of the fan cowls situated in the bottom section of the nacelle are substantially contiguous in the closed position and are kept in this closed position (locked position) by locking devices distributed along the lower contiguous edges of the fan cowls.

It is important to be able to check that a fan cowl is in the locked position before the aircraft takes off. In fact, a fan cowl which is in the closed position but is not locked can be torn off in flight by scooping. Under the effect of its own weight—in the order of 60 kg—and due to the position of its pivoting axis, a fan cowl tends to move closer to its closed position, even though it is difficult for an operator to determine visually whether a fan cowl is in the closed position or in the locked position.

It is known for the nacelle to be fitted with visual detection devices designed to make it clear that the fan cowls are not in the locked position. Hence, it is known for a system such as that described in French Patent Application FR20130056508 to be used, said patent being filed on behalf of the applicant in this case. In the embodiment described in FIG. 8 of this application, the system enables the lower contiguous edges of the fan cowls to be spaced apart via a system of springs resting one against the other while said lower sides are not in the locked position.

A system of this kind is effective but the physical effort required of an operator in order to overcome the load generated by the spacing mechanism and to move the lower contiguous edges of the fan cowls closer to one another, so as to be able to position said fan cowls in the locked position, is substantial, even if it still conforms to the ergonomic standards defined for a single individual.

SUMMARY OF THE INVENTION

The aim of the present invention is to overcome this disadvantage wholly or in part. To this end, the invention relates to an aircraft propulsion unit comprising a nacelle surrounding a propulsion member, the nacelle being substantially cylindrical and centered about a longitudinal axis and having a first and a second fan cowl arranged on both sides of a first plane of symmetry of the nacelle comprising the longitudinal axis, said fan cowls being movable between a closed position in which a lower side of the first fan cowl and a lower side of a second fan cowl are contiguous and an open position in which said lower sides are spaced apart, the nacelle moreover comprising a spacing mechanism having a first and a second elastic member, the first elastic member being fixed to the first fan cowl and the second elastic member being fixed to the second fan cowl, the nacelle moreover comprising at least one lateral locking mechanism having an anchoring point fixed to the nacelle and a movable member fixed to one of the first or the second fan cowl, the movable member being capable of being displaced towards a deployed position in which it is fixed to the anchoring point when the fan cowl is in the closed position.

The lateral locking mechanism is advantageously arranged in a second plane of symmetry of the nacelle, the second plane of symmetry comprising the longitudinal axis and being substantially perpendicular to the first plane of symmetry.

According to a first variant of the invention, each of said elastic members comprises a body confining an elastic element and a first end of a rod, the elastic element exerting a force on said first end, such that one end of the rod extends beyond the body in a plane perpendicular to the longitudinal axis, the spacing mechanism moreover comprising a stop that is fixed in relation to the nacelle, the stop comprising a planar wall in the first plane of symmetry, the free end of the rod of each of said elastic member being supported against said planar wall when the fan cowl on which said elastic member is fixed is displaced towards the closed position, beyond the slightly open position corresponding to a maximum elongation of the free end of the rod outside the body.

The stop is preferably fixed to the nacelle but in a second embodiment of the invention, the stop is fixed to the propulsion member surrounded by the nacelle.

BRIEF DESCRIPTION OF THE DRAWINGS

Other characteristics and advantages will emerge from the description that is going to follow the invention and which is given simply by way of example with regard to the attached drawings in which.

DETAILED DESCRIPTION OF THE PREFERRED EMBODIMENTS

Throughout the description, the terms "front" and "rear" are to be considered in relation to a forward movement direction of the aircraft, for example under the effects of the ejection of an air flow by a propulsion member of the aircraft. This direction is represented schematically by the arrow 100 in the figures.

Figure 1:
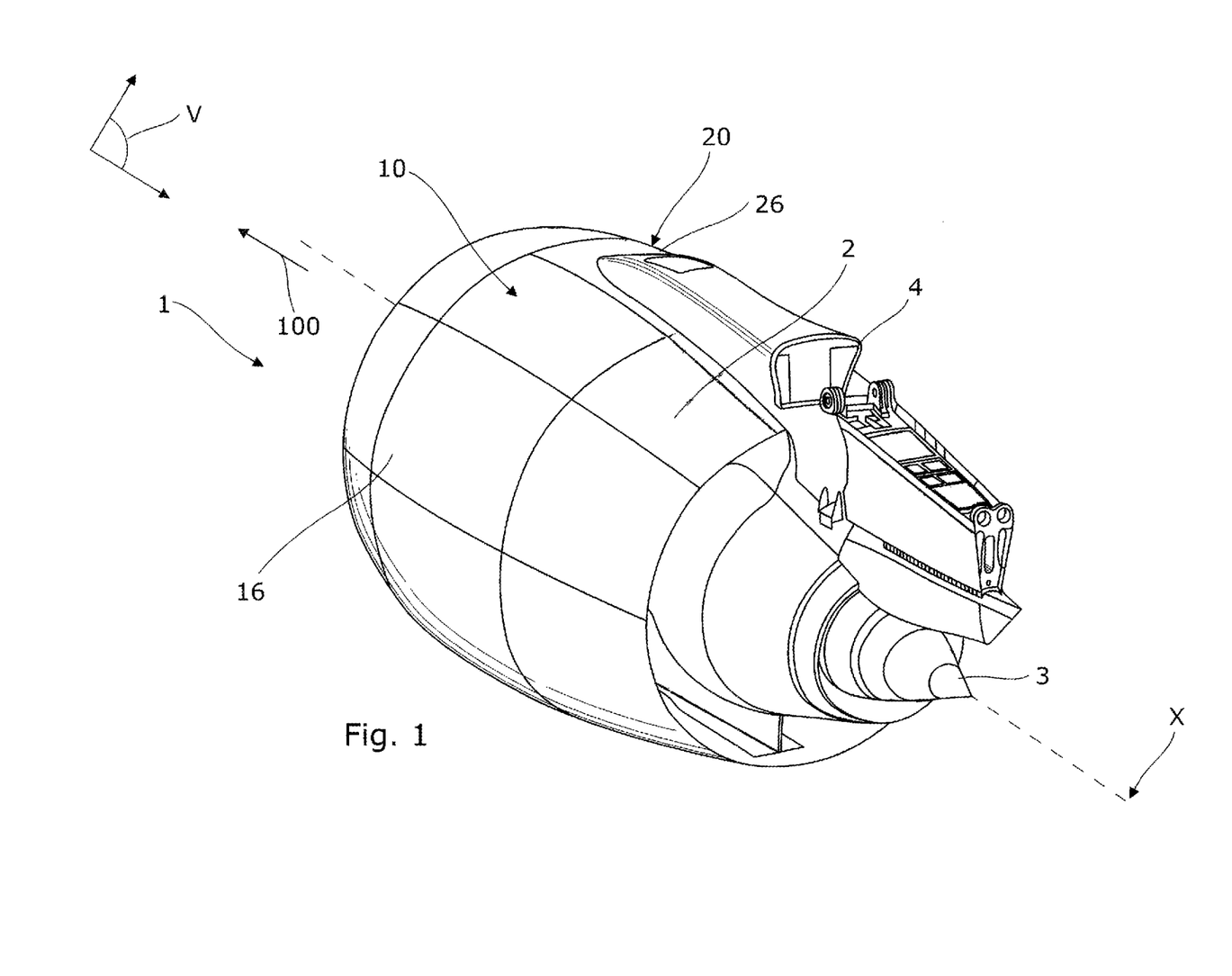
FIG. 1 is a perspective view in schematic form of an aircraft propulsion unit comprising a nacelle according to the invention, the nacelle having two fan cowls represented in the closed position.

With reference to FIG. 1, an aircraft propulsion unit 1 comprises a nacelle 2 surrounding a propulsion member 3, for example a turbojet engine. The nacelle 2 traditionally has a substantially cylindrical form centered about its longitudinal axis X. As specified above, the nacelle 2 comprises a first fan cowl 10 and a second fan cowl 20 distributed on both sides of a vertical plane of symmetry V (plane passing through an axis 12H-6H of the nacelle, using a watch analogy) of the nacelle 2 comprising the longitudinal axis X.

Figure 2:
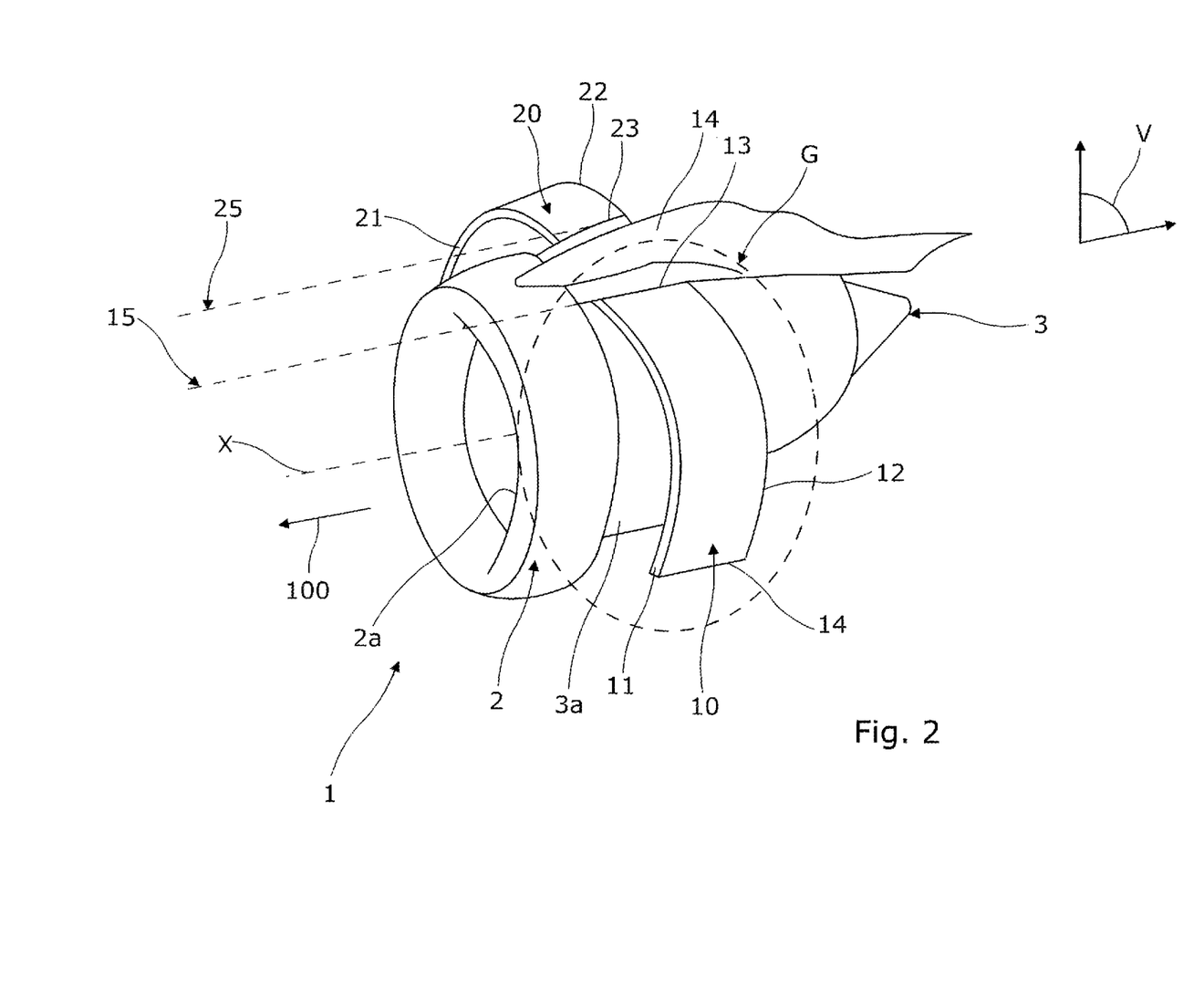
FIG. 2 is a schematic view of the propulsion unit illustrated in FIG. 1 according to another view, the fan cowls of the nacelle being shown in the open position.

As illustrated in FIG. 2, each fan cowl 10, 20 is substantially semi-cylindrical in shape, delimited laterally by a front lateral side 11, 21 and a rear lateral side 12, 22 and height-wise by an upper side 13, 23 and a lower side 14, 24 (24 is not shown in FIG. 2). The upper and lower sides of the fan cowls are substantially parallel to the longitudinal axis X. The upper side 13, 23 is provided in the upper section of the nacelle 2, at approximately 12H, at the level of the column 4 allowing the nacelle 2 to be fixed to an aircraft wing. In order to allow the fan cowls 10, 20 to pivot, the upper side 13, 23 of each of the fan cowls is articulated about a pivoting axis, 15, 25, substantially parallel to the longitudinal axis X.

The first fan cowl 10 and the second fan cowl 20 are therefore movable in relation to the nacelle 2 between a closed position in which they are shown in FIG. 1 and an open position in which they are shown in FIG. 2. This latter position gives access to the members surrounded by the nacelle 2, for example a housing 3a of the turbojet engine 3. It will be noted that in the closed position, as represented in FIG. 1, the outer face 16, 26 of the first and the second fan cowl, respectively, is disposed in the extension of the outer surface of the nacelle 2.

Figure 3:
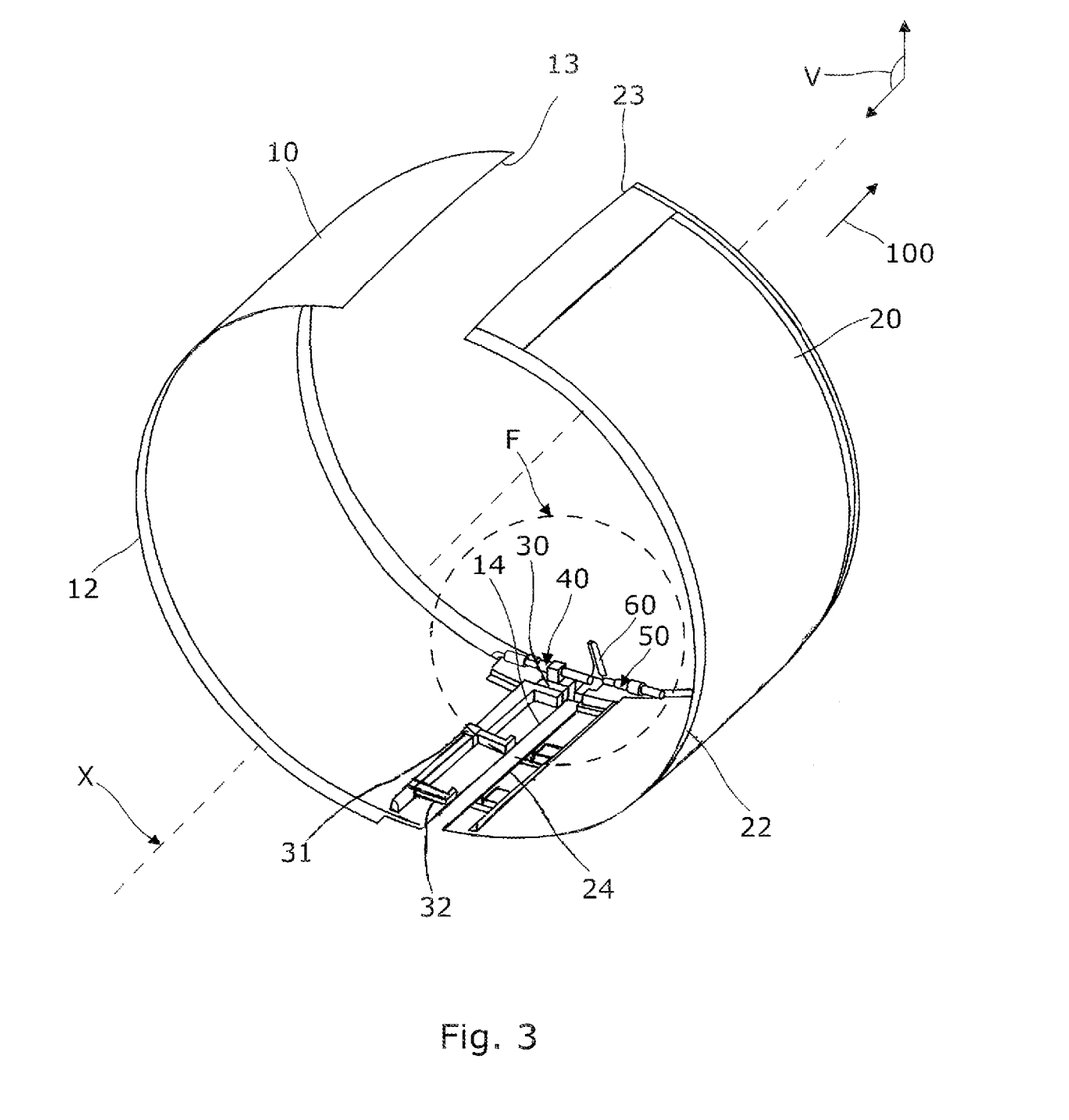
FIG. 3 is a perspective view in schematic form of the fan cowls of the nacelle in a slightly open position, illustrating the positioning of three locking and closing mechanisms allowing the fan cowls to be kept in the closed position (locking)

In the closed position, a fan cowl has its lower side situated in the vertical plane of symmetry V of the nacelle 2, in the bottom section of the nacelle 2, at approximately 6H. Hence, when the two fan cowls 10, 20 are in the closed position, the first fan cowl 10 and the second fan cowl 20 are contiguous at the level of their lower sides 14, 24, in the vertical plane of symmetry V of the nacelle 2. In order to ensure that the closed position is maintained, in other words to ensure the locked position, several fan cowl locking and closing mechanisms are arranged on the two fan cowls 10, 20 at the level of the lower sides 14, 24. Hence, and as illustrated in FIG. 3, the fan cowls 10, 20 comprise three locking and closing mechanisms 30, 31, 32 (from front to rear) distributed along the longitudinal axis X.

Figure 4:
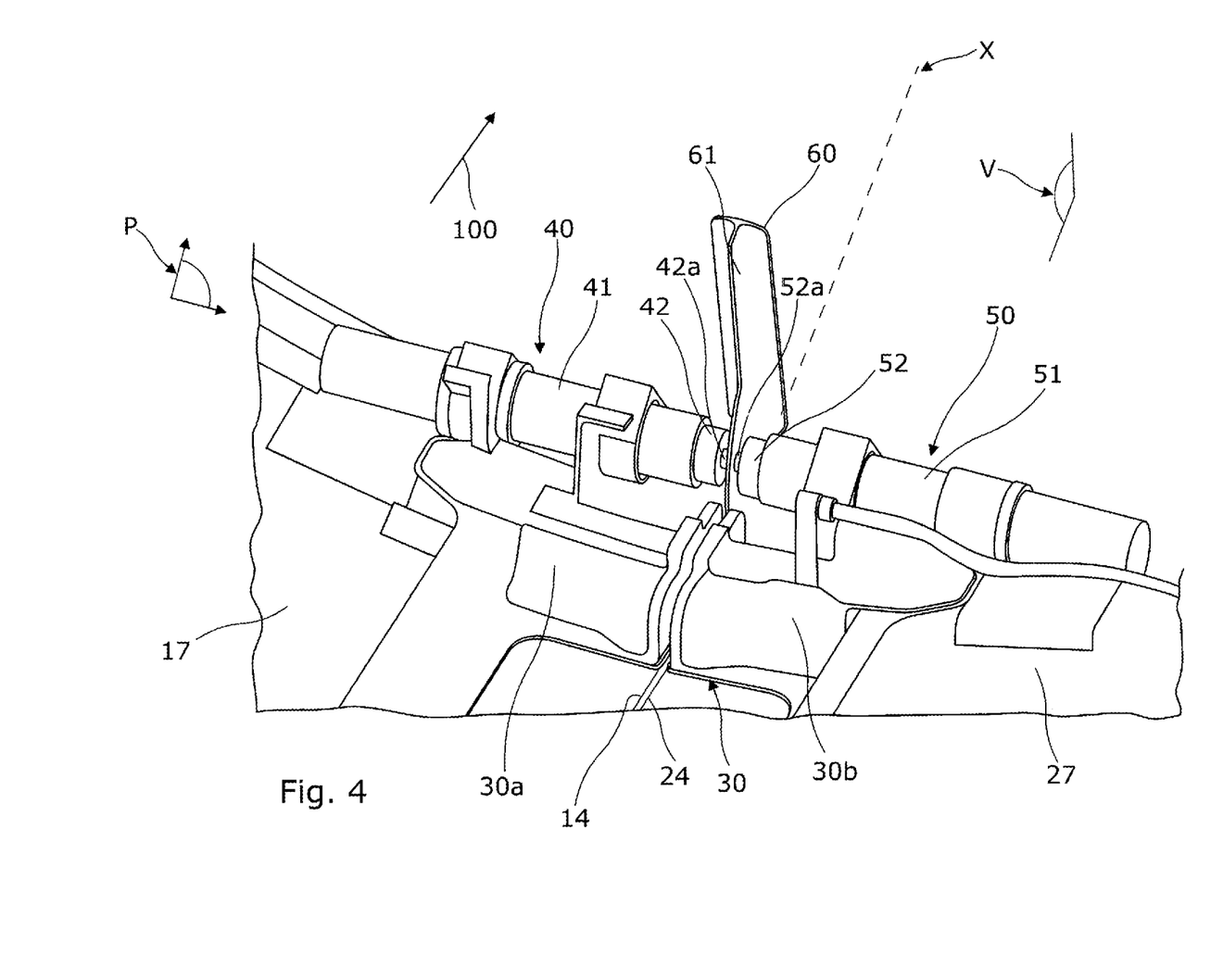
FIG. 4 is an enlarged view of zone F depicted in FIG. 3 and illustrates in detail a fan cowl spacing mechanism mounted on one of the three locking and closing mechanisms shown in FIG. 3.

With reference to FIG. 4 and in a known manner, each locking and closing mechanism 30 comprises an anchoring assembly 30a comprising an anchoring point (not shown) and a hooking assembly 30 having a hook (not shown). The anchoring assembly is provided at the level of the lower side 14 of the first fan cowl 10, whereas the hooking assembly 30b is provided at the level of the lower side 24 of the second fan cowl 20. The hook is designed to grab the anchoring point in order to keep the fan cowls 10, 20 in the closed position (locking). In order to maneuver the hook, the locking and closing mechanism comprises a pivoting handle (not shown) articulated about an axis substantially parallel to the longitudinal axis X. The hook is designed to adopt two states: a first locked state in which it is hooked to the anchoring point so as to keep the fan cowls 10, 20 in the closed position and a second unlocked state in which it is not hooked to the anchoring point, which corresponds to the open state or else to the closed but not locked state of the fan cowls 10, 20. In the case in which the fan cowls 10, 20 are in the locked position, the handle is confined within a housing (not shown in the figures) positioned at the level of the outer face 26 of the second fan cowl 20, in order to ensure the continuity of the outer surface of the nacelle 2. Where appropriate, the handle hangs by gravity on its articulation axis.

The nacelle 2 comprises at least one spacing mechanism for the fan cowls 10, 20 attached to one of the locking and closing mechanisms 30, 31, 32. A spacing mechanism comprises a first elastic member 40 fixed to the first fan cowl 10 and a second elastic member 50 fixed to the second fan cowl 20. It will be noted that in the example illustrated in FIG. 3, the spacing mechanism for the fan cowls is attached to the locking and closing mechanism 30 situated furthest forward from the nacelle 2.

An elastic member 40, 50 comprises a body 41, 51 having the form of a cylindrical tube in which a piston is designed to move under the action of a spring. The body 41, 51 forms the wall of a cylindrical chamber which has a first end wall forming a first base surface and a second end wall forming a second base surface of the cylindrical chamber. The piston is supported against the body and is capable of moving back and forth axially in the cylindrical chamber and thereby divides the chamber into a first space between the piston and the first end wall and a second space between the piston and the second end wall. The piston is connected to a piston rod 42, 52 which is movable axially and supported such that it can slide in an orifice forming a piston rod guide located at the level of the first end wall. Hence, the piston rod 42, 52 has a free end 42a, 52a extending axially beyond the first end wall.

An elastic element, for example a spring, is provided in the second space, in order to exert a pushing effort on the piston, this effort tending to move the piston towards the first end wall, thereby moving the free end 42a, 52a of the rod 42, 52 as far as a maximum rod elongation position beyond the body 41, 51. The maximum elongation position corresponds to the maximum path of the piston in the body and is in the order of 150 mm, measured from the first end wall.

As illustrated in FIG. 4, the body 41 of the first elastic member 40 is fixed on the inner face 17 of the first fan cowl 10 and, more particularly, on the anchoring assembly 30a of the locking and closing mechanism 30. The body 51 of the second elastic member 50 is fixed on the inner face 27 of the second fan cowl 20, on the hooking assembly 30b of the locking and closing mechanism 30.

The rods 42, 52 of the first and second elastic member 40, 50, respectively, are substantially coplanar in a plane P perpendicular to the longitudinal axis X and to the plane V. Hence, each piston rod 42, 52 extends in this plane P perpendicular to the longitudinal axis X of the nacelle 2 and this applies whatever the opening angle of the fan cowl.

The spring of each of the elastic members 40, 50 is of such dimensions as to apply a force greater than a force due to the weight of a fan cowl 10, 20 and tending to move the fan cowl closer to its closed position. For example, a spring typically exerts a force in the order of 20 daN on the piston for a fan cowl having a weight of around 60 kg.

For each elastic member 40, 50 of a fan cowl, the piston 42, 52 is configured to move between two positions: a first position corresponding to the position in which the rod 42, 52 is located when the fan cowl is closed and where the free end of the rod 42a, 52a is substantially flush with the lower side 14, 24 of the fan cowl, and a second position corresponding to the maximum elongation position of the rod 42, 52, where the free end 42*a*, 52*a* extends beyond the lower side 14, 24 of the fan cowl, for example by a distance in the order of 100 to 150 mm.

The free ends 42*a*, 52*a* of each of the elastic members are supported against one another when the first and the second fan cowls 10, 20 are held in the closed position (the rods 42, 52 are then in the first position as described above) up to an intermediate position (the rods 42, 52 are then in the second position as described above).

Figure 5:
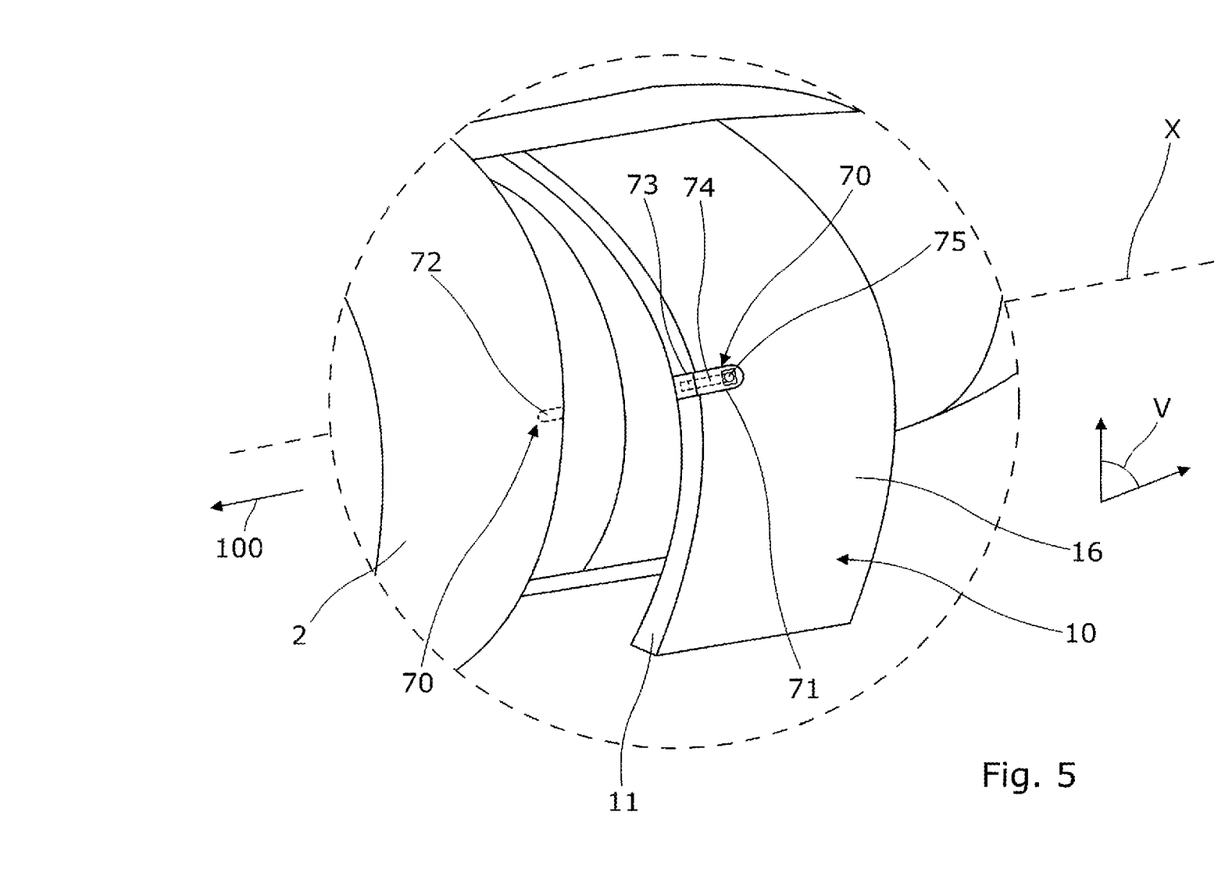
FIG. 5 is an enlarged view of zone G depicted in FIG. 2 and illustrates in detail a lateral locking mechanism of the first fan cowl.

According to the invention, the nacelle moreover comprises a mechanism for maintaining the closed position of a fan cowl or a lateral locking mechanism 70. As illustrated in FIG. 5, the lateral locking mechanism 70 is arranged at the level of the nacelle 2 and of the front lateral side 11 of the first fan cowl 10, substantially in a horizontal plane of symmetry (plane passing through an axis 3H-9H of the nacelle) of the nacelle 2 comprising the longitudinal axis X. The lateral locking mechanism 70 comprises a sliding latch 71 arranged on the inner face 17 of the first fan cowl, substantially at 3H, and an anchoring point 72 arranged on the inner surface, substantially at 3H, of the nacelle 2 and adapted to accommodate a member 74 of the sliding latch 71. The sliding latch comprises a housing 73 arranged in a cutout made in the inner face 17 of the first fan cowl 10, a catch 74 being housed in the housing 73 and an actuation element 75 fixed to the catch 74 and sliding in the plane of the first fan cowl. The catch 74 is located on the inner face 17 of the first fan cowl 10, whereas the actuating element 75 can be actuated from the outer face 16 of the first fan cowl 10. The anchoring point 72 has a shape complementary to the shape of the catch 74.

The actuator member 75 allows an operator to move the catch 74 from a deployed position into a retracted position and vice versa. In its deployed position, the catch 74 is received by the anchoring point 72 and in its retracted position the catch 74 is retracted in the housing 73 and does not extend beyond the front lateral side 11 of the first fan cowl 10.

In the event that the lateral locking mechanism 70 comprises a sliding latch as described above, the installation of the anchoring point on the inner wall of the nacelle 2 makes it possible to keep the first fan cowl 10 on the nacelle 2 in the closed position (in other words, locked).

The lateral locking mechanism 70 acts in the closing procedure of the fan cowls 10, 20. In effect, an operator positions the first fan cowl 10 provided with the lateral locking mechanism 70 in the closed position by exerting an effort greater than the force applied by the springs of the first and second elastic members 40, 50, respectively, and keeps it in this closed position by actuating the actuating member 75 of the lateral locking mechanism 70, such as to move the catch 74 in the deployed position. Once the first fan cowl 10 is held in the closed position, the operator slips under the bottom section of the nacelle 2 at 6H and exerts an effort greater than the force applied by the springs of the first and second elastic members 40, 50, respectively, so as to move the lower side of the first fan cowl closer to the lower side of the second fan cowl, then actuates the locking and closing mechanism 30 before being able to stop their effort. The operator can then actuate the two other locking and closing mechanisms 31, 32 successively.

The invention moreover allows easy visual detection of a fan cowl of a nacelle of an aircraft propulsion unit open in the unlocked position but apparently closed, spacing the lower side of a fan cowl of this kind from the plane of symmetry V when it is not locked.

The device thereby developed may be advantageously supplemented with apparatus known in the state of the art to allow visualization of an open fan cowl. For example, bright paint can be applied to the inside of the fan cowl or the nacelle, so that it is masked when the fan cowls are in the closed position but highly visible as soon as the fan cowls are no longer in the closed position.

The device has its preferable application in an airplane. It exhibits an even greater advantage when the locking and closing mechanisms 30, 31, 32 are positioned in barely visible zones, as is particularly the case in certain "single-aisle" aircraft in which the nacelles have low ground clearance.

In a first embodiment of the invention, the spacing mechanism of the fan cowls further comprises a stop 60.

With reference to FIGS. 3 and 4, the stop 60 is a metallic part having a wall 61 that is substantially planar in the vertical plane of symmetry V of the nacelle and is situated in the low part of the nacelle 2, approximately at 6H. It is substantially in this same vertical plane of symmetry V and in the bottom section of the nacelle 2 that the lower sides 14, 24 of the fan cowls 10, 20 join when the latter are in the closed position and are locked.

It will be noted that in the example illustrated in FIGS. 3 and 4, the stop 60 is a metallic part fixed to the nacelle 2. It is fixed to the air input 2*a* of the nacelle, for example, situated at the front of the nacelle.

The free ends 42*a*, 52*a* of each of the elastic members are therefore supported against the wall 61 of the stop 60 when the first and the second fan cowls 10, 20 are kept in the closed position (the rods 42, 52 are in the first position as described above) up to an intermediate position (the rods 42, 52 are then in the second position as described above).

According to this first variant, the effort required by a mechanic to position the fan cowls 10, 20 in the locked position via three locking and closing mechanisms 30, 31, 32 of the fan cowls is less relative to the mechanisms. In effect, the lateral locking mechanism 70 allows one of the two fan cowls to be kept in the closed position, so as to reduce the spacing between the two lower sides of the fan cowls 10, 20, whereas the advantageous presence of the stop 60 allows the operator to provide only that effort required to overcome the force exerted by a single spring at a time. In fact, according to this first variant, in order to close and lock the fan cowls 10, 20, an operator positions the first fan cowl 10 provided with the lateral locking mechanism 70 in the closed position, by exerting an effort greater than the force applied by the spring of the first elastic member 40 and keeps it in this position by actuating the actuating member 75 of the lateral locking mechanism 70, so as to move the catch 74 into the deployed position. Once the first fan cowl 10 is held in the closed position, the operator slips under the bottom section of the nacelle 2, at 6H, and exerts an effort greater than the force applied by the spring of the second elastic member 50, so as to move the lower side of the first fan cowl closer to the lower side of the second fan cowl, then actuates the locking and closing mechanism 30, so as to keep the fan cowls in the locked position. The operator can then actuate the other two locking and closing mechanisms 31, 32 successively.

The stop 60 at 6H acting as the intermediate support between the two fan cowls thereby allows visibility of the unlocked state of the fan cowls 10, 20 (constant spacing of each side of the nacelle) to be guaranteed, despite the rubbing of the lateral sides of the fan cowls against the nacelle 2.

In a second variant of the invention, the stop 60 is fixed to the turbojet engine 3 contained in the nacelle 2. The stop 60 in this case is a part extending vertically downwards relative to the turbojet engine and having a planar wall in the vertical plane of symmetry V of the nacelle 2.

The elastic members described above may be made up of other elastic members performing a function equivalent to that of the springs. Hence, hydraulic apparatus or pneumatic apparatus can be used as elastic elements, without leaving the framework of the present invention.

Finally, instead of the lateral locking mechanism 70 system described above, other apparatus performing an equivalent function may be used without leaving the framework of the present invention. Hence, according to the invention, a lateral locking mechanism comprises a lateral locking mechanism having an anchoring point fixed to the nacelle and a movable member fixed to one of the first or second fan cowl, the movable member being able to be moved towards a deployed position in which it is fixed to the anchoring point when the fan cowl is in a closed position.

Although described as being arranged in part on the first fan cowl 10, the lateral locking mechanism 70 may likewise be arranged on the second fan cowl 20. It is preferably arranged on the fan cowl of the nacelle which is closest to the end of the aircraft wing.

Finally, although described as being arranged substantially at the level of the horizontal plane of symmetry H, the lateral locking mechanism 70 may likewise be arranged between 11H and 7H or between 1H and 5H, depending on the fan cowl under consideration.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft propulsion unit comprising:
    a nacelle surrounding a propulsion member,
    the nacelle being substantially cylindrical and centered about a longitudinal axis and having a first and a second fan cowl arranged on both sides of a first plane of symmetry of the nacelle comprising the longitudinal axis,
    said fan cowls being movable between a closed position in which a lower side of the first fan cowl and a lower side of the second fan cowl are contiguous and an open position in which said lower sides are spaced apart,
    the nacelle moreover comprising a spacing mechanism having a first and a second elastic member,
    the first elastic member being fixed to the first fan cowl and the second elastic member being fixed to the second fan cowl,
    the nacelle further comprising at least one lateral locking mechanism having an anchoring point fixed to the nacelle and a movable member fixed to one of the first or the second fan cowl, and
    the movable member being capable of being displaced towards a deployed position in which the movable member is fixed to the anchoring point when the fan cowl is in the closed position,
    wherein each of said elastic members comprises a body confining an elastic element and a first end of a rod, the elastic element exerting a force on said first end, such that one free end of the rod extends beyond the body in a plane perpendicular to the longitudinal axis, the spacing mechanism moreover comprising a stop that is fixed in relation to the nacelle, the stop comprising a planar wall in the first plane of symmetry, the free end of the rod of each of said elastic members being supported against said planar wall when the fan cowl on which said elastic member is fixed is displaced towards the closed position.

2. The aircraft propulsion unit according to claim 1, wherein the lateral locking mechanism is arranged in a second plane of symmetry of the nacelle, the second plane of symmetry comprising the longitudinal axis and being substantially perpendicular to the first plane of symmetry.

3. The aircraft propulsion unit according to claim 1, wherein the stop is fixed to the nacelle.

4. The aircraft propulsion unit according to claim 1, wherein the stop is fixed to the propulsion unit.

5. An aircraft comprising a propulsion unit comprising:
    a nacelle surrounding a propulsion member,
    the nacelle being substantially cylindrical and centered about a longitudinal axis and having a first and a second fan cowl arranged on both sides of a first plane of symmetry of the nacelle comprising the longitudinal axis,
    said fan cowls being movable between a closed position in which a lower side of the first fan cowl and a lower side of the second fan cowl are contiguous and an open position in which said lower sides are spaced apart,
    the nacelle moreover comprising a spacing mechanism having a first and a second elastic member,
    the first elastic member being fixed to the first fan cowl and the second elastic member being fixed to the second fan cowl,
    the nacelle further comprising at least one lateral locking mechanism having an anchoring point fixed to the nacelle and a movable member fixed to one of the first or the second fan cowl, and the movable member being capable of being displaced towards a deployed position in which the movable member is fixed to the anchoring point when the fan cowl is in the closed position,
    wherein each of said elastic members comprises a body confining an elastic element and a first end of a rod, the elastic element exerting a force on said first end, such that one free end of the rod extends beyond the body in a plane perpendicular to the longitudinal axis, the spacing mechanism moreover comprising a stop that is fixed in relation to the nacelle, the stop comprising a planar wall in the first plane of symmetry, the free end of the rod of each of said elastic members being supported against said planar wall when the fan cowl on which said elastic member is fixed is displaced towards the closed position.

* * * * *